(12) United States Patent
Lin

(10) Patent No.: US 9,200,616 B2
(45) Date of Patent: Dec. 1, 2015

(54) AUTOMATIC ADJUSTMENT DEVICE FOR ADJUSTING INCLINATION OF BLADES OF WIND TURBINES

(71) Applicant: KUN SHAN UNIVERSITY, Tainan (TW)

(72) Inventor: Shueei-Muh Lin, Tainan (TW)

(73) Assignee: Kun Shan University, Tainan (TW)

( * ) Notice: Subject to any disclaimer, the term of this patent is extended or adjusted under 35 U.S.C. 154(b) by 648 days.

(21) Appl. No.: 13/671,985

(22) Filed: Nov. 8, 2012

(65) Prior Publication Data

US 2014/0127015 A1    May 8, 2014

(51) Int. Cl.
*F03D 7/04* (2006.01)
*F03D 7/02* (2006.01)

(52) U.S. Cl.
CPC ............ *F03D 7/0204* (2013.01); *F03D 7/0224* (2013.01); *F05B 2260/70* (2013.01); *F05B 2260/74* (2013.01); *Y02E 10/723* (2013.01)

(58) Field of Classification Search
CPC ... F03D 7/0204; F03D 7/0224; F03D 7/0244; F03D 7/0248; F03D 7/026; F03D 7/0264; F03D 7/0276; F03D 7/04; F03D 7/041; F05B 2260/70; F05B 2260/71; F05B 2260/74; Y02E 10/723

USPC ................. 416/27, 44, 47, 48, 147, 151, 156, 416/157 R, 157 A, 160, 162, 163, 164
See application file for complete search history.

(56) References Cited

U.S. PATENT DOCUMENTS 4,578,019 A * 3/1986 Safarik ................... B64C 11/34
 416/1

* cited by examiner

*Primary Examiner* — Christopher Verdier
*Assistant Examiner* — Aaron R Eastman
(74) *Attorney, Agent, or Firm* — Rosenberg, Klein & Lee

(57) ABSTRACT

An automatic adjustment device for adjusting inclination of blades of wind turbines includes a first housing having multiple blades connected thereto and each blade has a first connection portion which is inserted into the firs housing. A transmission unit is connected to the first housing. A pump unit and a speed-changing member are mechanically connected to the transmission unit. The pump unit is mechanically connected to the speed-changing member. The pump unit has a driving unit which is connected with a transmission disk which is connected to the connection portions of the blades. The pump unit is activated by speed difference between the speed-changing member and the transmission unit so as to rotate the transmission disk via the driving unit, and adjust the inclination angle of the blades to protect the blades and increase the efficiency of the wind turbine.

10 Claims, 21 Drawing Sheets

US 9,200,616 B2

AUTOMATIC ADJUSTMENT DEVICE FOR ADJUSTING INCLINATION OF BLADES OF WIND TURBINES

FIELD OF THE INVENTION

The present invention relates to an automatic adjustment device, and more particularly, to an automatic adjustment device for adjusting inclination of blades of wind turbines according to wind velocity so as to reduce the starting wind velocity and prevent the turbine from being damaged due to high speed.

BACKGROUND OF THE INVENTION

The conventional alternative energy is developed for replacement of petro energy and the wind power is chosen to generate electric power. However, the speed of wind cannot be controlled precisely, if the wind velocity is too low, the turbine cannot be started, if the wind is too high, the turbine is easily damaged. The efficiency of generating electric power varies according to different wind velocities.

The inclination angle, the length and the surface area affect the speed of the blades. Under the same wind velocity, the larger the inclination angle of the blades, the torque and the air resistance become higher, and vice versa. Therefore, the adjustment of the inclination angle, the length and the surface area of the blades according the change of the wind velocity is necessary, wherein the adjustment of the inclination angle is easily achieved. FIG. 1 shows a conventional wind turbine and has an exterior wind velocity sensing device to detect the wind velocity. The wind turbine comprises a base 10 with a housing 20 connected thereto, and multiple blades 201 are provided. A receiver 30 is located in the housing 20 and operated corresponding to the wind velocity sensing device so as to calculate the inclination angle for the blade 201 at different wind velocities. The receiver 30 is electrically connected to a motor 301 which adjusts the inclination angle of the blade 201 by a transmission unit 302. The housing 20 is connected to a speed-increasing gear set and a generator 50 via a transmission shaft to increase the efficiency of the turbine. However, the exterior wind velocity sensing device and the motor 301 require electric power to monitor the wind velocity and adjust the inclination angle of the blade.

Besides, when the wind is too high, the torque generated by the blade 201 increases so that the speed of the blade increases. The significant centrifugal force may break the blade and the generator 50 may be burned so that the speed needs to be controlled. An electric speed-reducing device 60 is located between the base 10 and the housing 20 so as to reduce the speed of the blades 201. Nevertheless, it requires a lot of power to reduce the speed of the blades 201 when the wind velocity is high, and the electric speed-reducing device 60 will be burned after a long period of operation.

FIG. 2 and FIG. 3 disclose another conventional wind turbine 70 which has a tail wing unit 701 which swings to change the direction of the turbine 70 relative to the wind so that the wind force applied to the blades is reduced and the speed of the blades is reduced. However, the swinging turbine 70 obviously is not stable.

For the stationary blades, as shown in FIG. 4, assume that the wind velocity is $V_{wind}$ and an attack angle $\alpha$ is formed between the blade 80 and the $V_{wind}$. Assume that the length of the blade 80 is R, the revolution of the blade 80 is N, and the inclination angle $\beta$ at the outside of the distal end of the blade 80 is almost 90 degrees. When the N is zero, the $V_{wind}$ is perpendicular to the $\alpha$ and $\beta$ of the blade 80 so that the blade 80 cannot generate push force. When the N reaches a large number and the a is a positive value, because the blades 80 are stationary, the $\beta$ is remained to be almost 90 degrees. As shown in FIG. 5, the relative velocity of the $V_{wind}$ to the blade 80 is represented by V, and the tangential velocity that the $V_{wind}$ generates relative to the blade 80 is represented by $V_t$, the relationship between the $V_{wind}$ and the $V_t$ is expressed by the equation $V_t=(2\pi NR)/60$. The $V_{wind}$ generates a lift coefficient $C_L$, the relationship between the $C_L$ and the $\alpha$ is expressed in FIG. 6. When the $\alpha$ is larger than a pre-set value, the $C_L$ will be quickly reduced to make the N of the blade 80 stall.

For the conventional wind turbines, the manufacturing and maintenance expenses for the wind velocity sensing device, the motor and the electric speed-reducing device are high, and the blades cannot be stopped when the wind velocity is too high. Besides, when the wind velocity is high, the speed of the blades cannot be maintained at a constant speed so that the electric speed-reducing device and the blades are easily damaged. Besides, the wind turbine with the tail wing makes the wind turbine swing all the time and therefore causes fatigue and instability. These drawbacks are needed to be improved.

The present invention intends to provide a wind turbine that improves the drawbacks mentioned above.

SUMMARY OF THE INVENTION

The present invention relates to an automatic adjustment device for adjusting inclination of blades of wind turbines, and comprises a first housing having multiple blades connected thereto and each blade has a first connection portion which is inserted into the firs housing. A transmission unit is connected to the first housing. A pump unit and a speed-changing member are mechanically connected to the transmission unit. The speed-changing member changes the speed from the transmission unit. The pump unit is mechanically connected to the speed-changing member. The speed-changing member is connected to a generating device at an end away from the pump unit. The pump unit has a driving unit which is connected with a transmission disk and the transmission disk is connected to the connection portions of the blades. The connection portion is a gear and the transmission disk is a toothed disk so as to be engaged with the connection portion.

The pump unit is activated by speed difference between the speed-changing member and the transmission unit so as to rotate the transmission disk via the driving unit and to adjust inclination angle of the blades. When the pump unit is activated by speed difference between the speed-changing member and the transmission unit, the driving unit rotates the disk by an angle $\theta$ and the inclination angle of the blades is changed an angle $\beta$. When the first housing has zero speed, which means that the blades are not driven by the wind, the angle $\beta$ of the blades sets the blades to be easily applied by the wind to generate torque, such that the starting wind velocity is lowered. When the speed of the first housing is larger than a pre-set value, the angle $\beta$ of the blades sets the blades not to generate torque, such that the blades and the wind turbine are protected from high revolution speed.

The pump unit is a hydraulic oil pump and activated by speed difference between the speed-changing member and the transmission unit. The driving unit has a cylinder which is connected to a movable member. The movable member is connected to the transmission disk via the transmission shaft. The pump unit delivers hydraulic liquid so that the driving unit drives the transmission disk and the transmission shaft.

The transmission disk then drives the blades to be adjusted and have the desired inclination angle.

The cylinder has a rod which is connected to the movable member. A resilient member is connected between the cylinder and the rod so as to assist the pump unit to drive the movable member and to drive the transmission shaft and the transmission disk.

A resilient member is connected to one end of the movable member and located away from the transmission shaft and the cylinder. Because the pump unit is a hydraulic oil pump and activated by speed difference between the speed-changing member and the transmission unit, when the speed difference is reduced or to be zero due to the reduction of the wind velocity, the resilient member rotates the movable member reversibly to drive the transmission shaft and the transmission disk. Therefore, the inclination angle of the blades is adjusted to reduce the starting wind velocity to maintain the good efficiency.

A second housing is mounted to the transmission unit and has a tail wing so as to make the wind turbine to face the wind.

The primary object of the present invention is to provide a wind turbine which does not need the wind velocity sensing device and the electric speed reducing device. The inclination angle of the blades is automatically adjusted by mechanical way. By the change of the speed of the first housing, the pump unit is activated to drive the movable member, the transmission shaft and the transmission disk so as to adjust the inclination angle of the blades. When the speed of the first housing is larger than a pre-set value, the inclination angle of the blades is adjusted so that the blades cannot generate torque. In other words, the blades are parallel to the direction of the wind. Therefore, the first housing does rotate and the generating processes are stopped. The blades are protected from being broken due to the strong wind velocity. The generating device is protected from being high speed operation. The adjustment of the blades does not need extra electric power.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
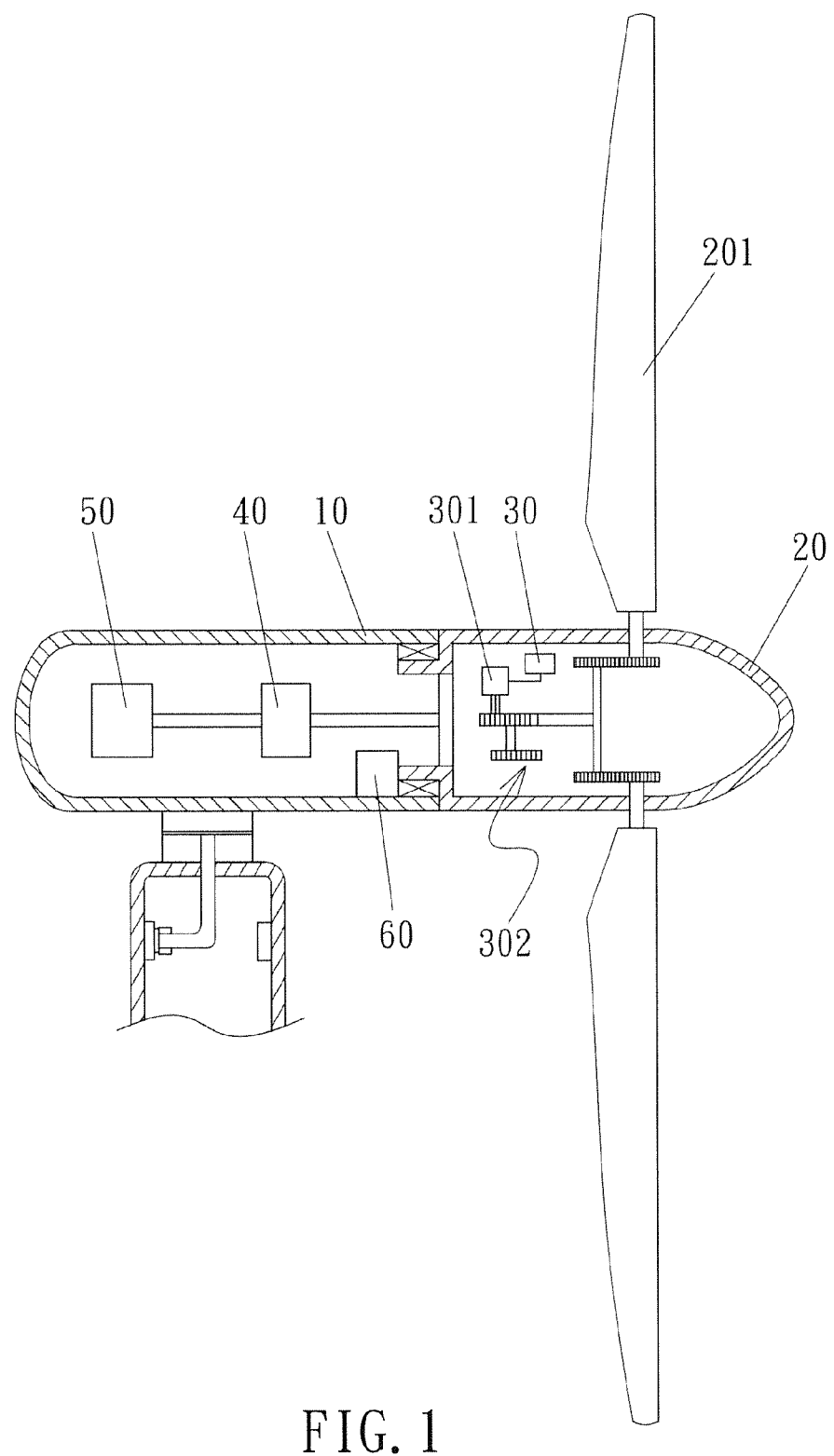
FIG. 1 shows the conventional wind turbine with electric adjustment device for adjusting the inclination angle of the blades.
Figure 2:
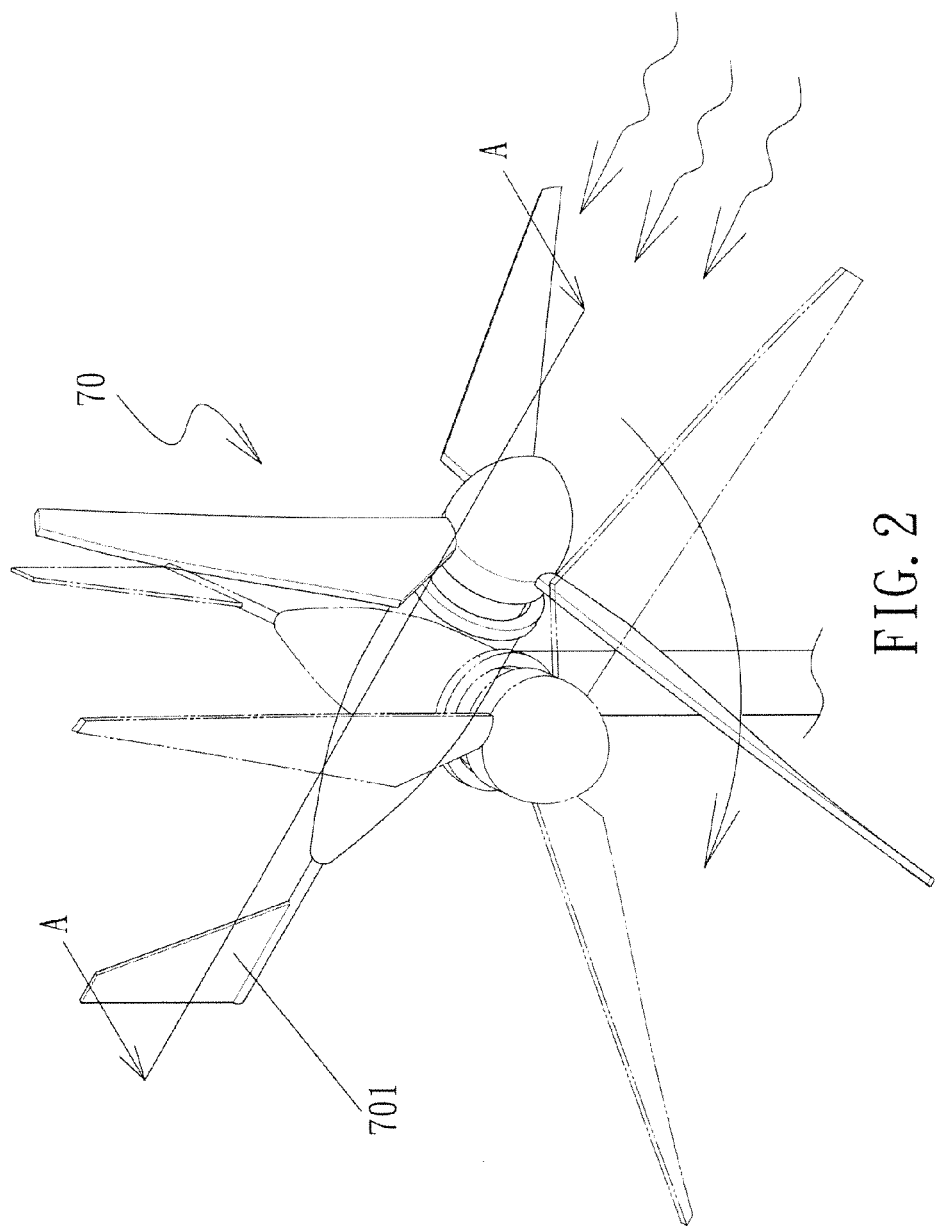
FIG. 2 shows the conventional wind turbine with a tail wing.
Figure 3:
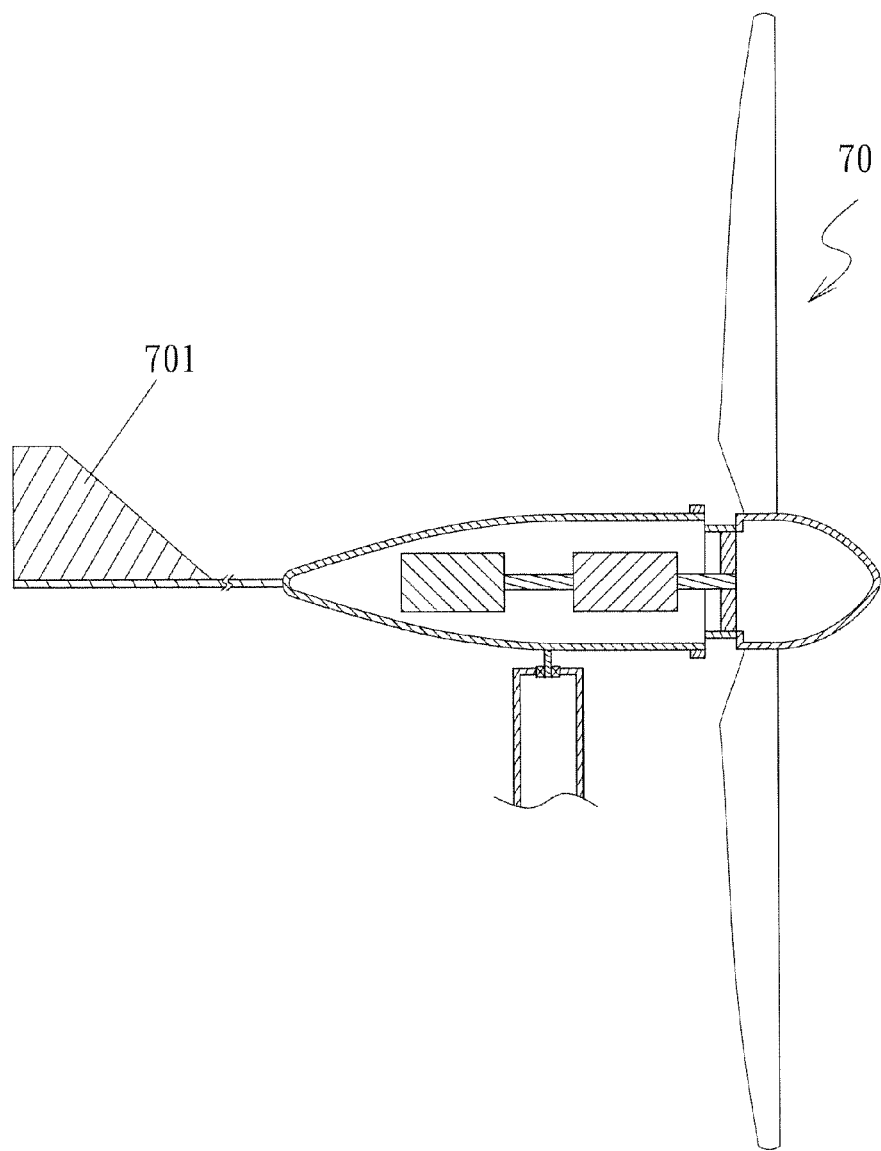
FIG. 3 is a cross sectional view taken along line A-A in FIG. 2.
Figure 4:
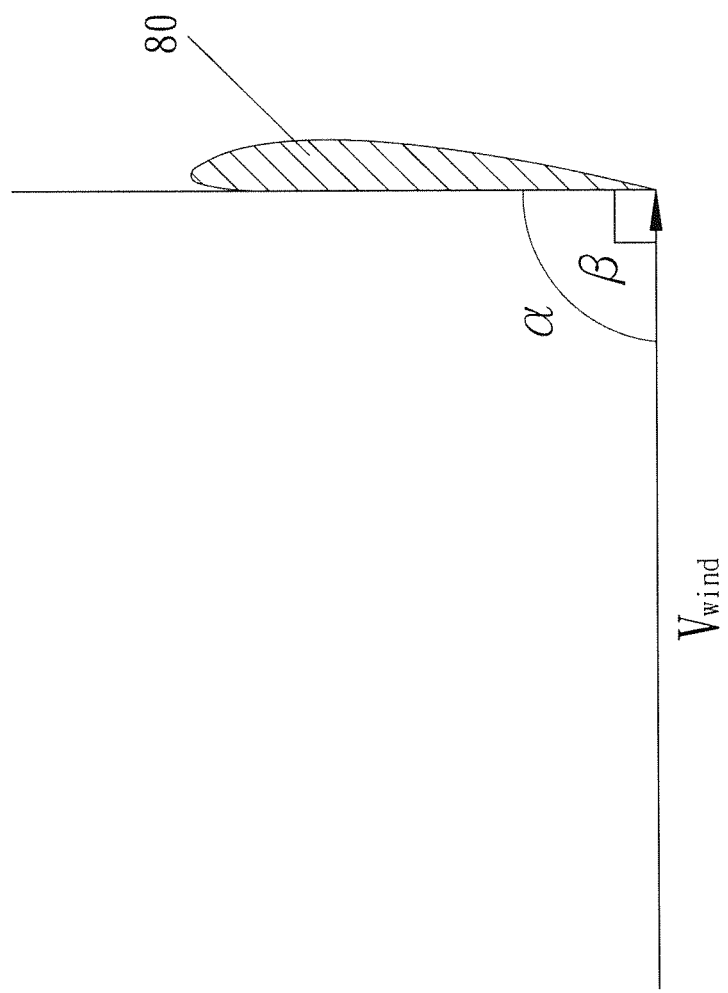
FIG. 4 shows the relationship between the stationary blade and the wind velocity of a stationary wind turbine.
Figure 5:
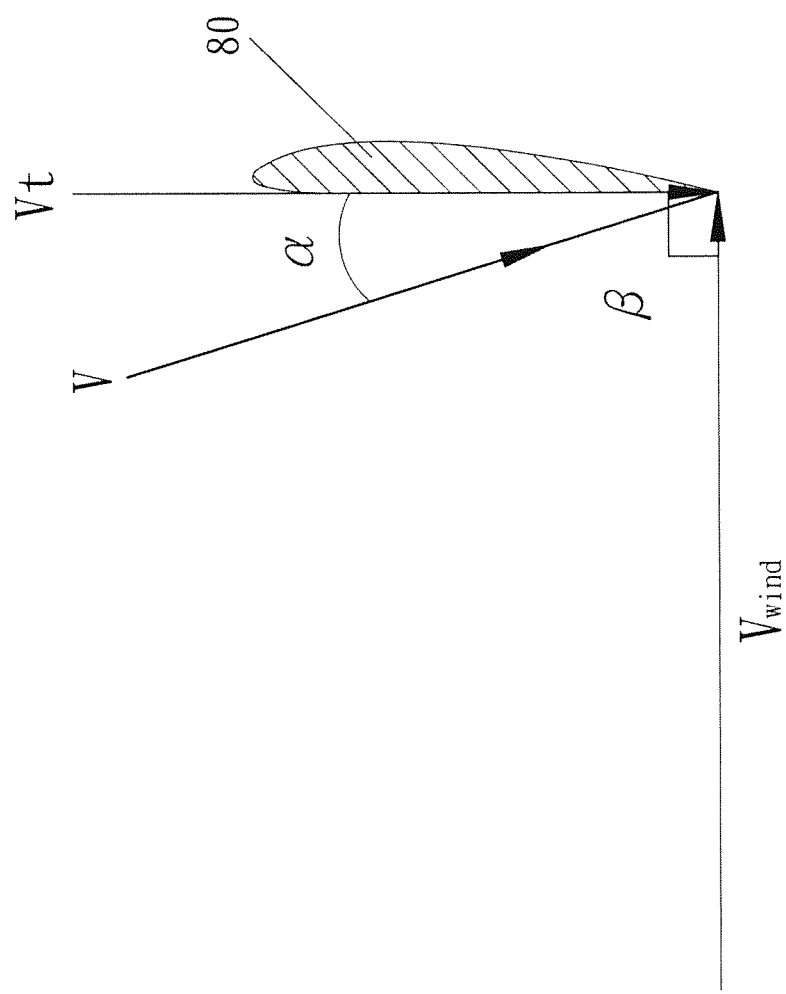
FIG. 5 shows the relationship between the rotating blade and the wind velocity of a stationary wind turbine.
Figure 6:
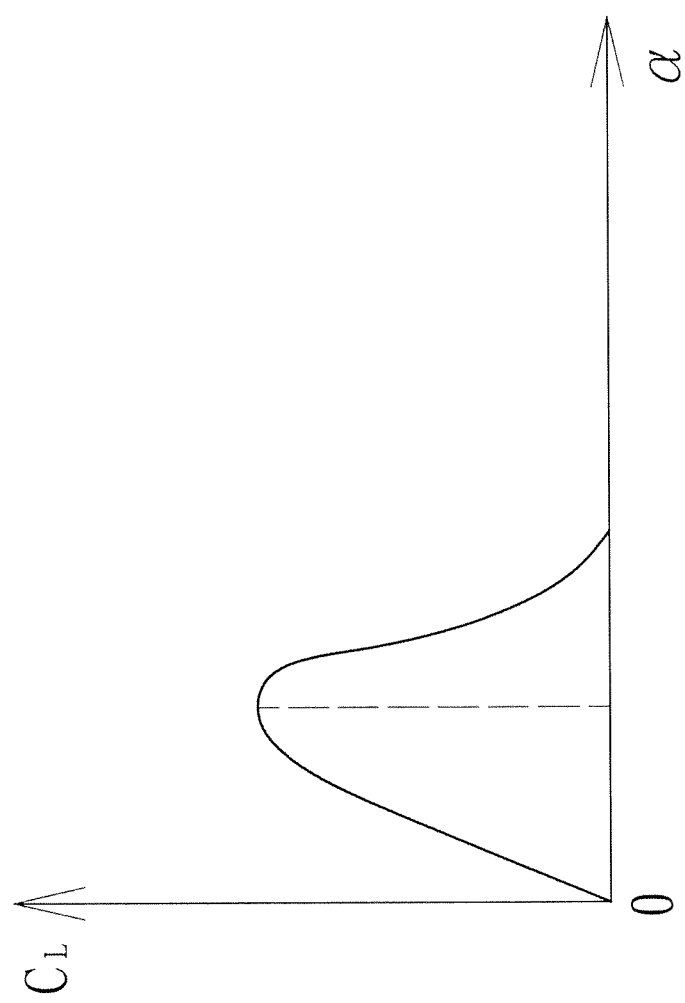
FIG. 6 shows the relationship between the lift coefficient and attack angle of the blade of a stationary wind turbine when the blade is applied by the wind.
Figure 7:
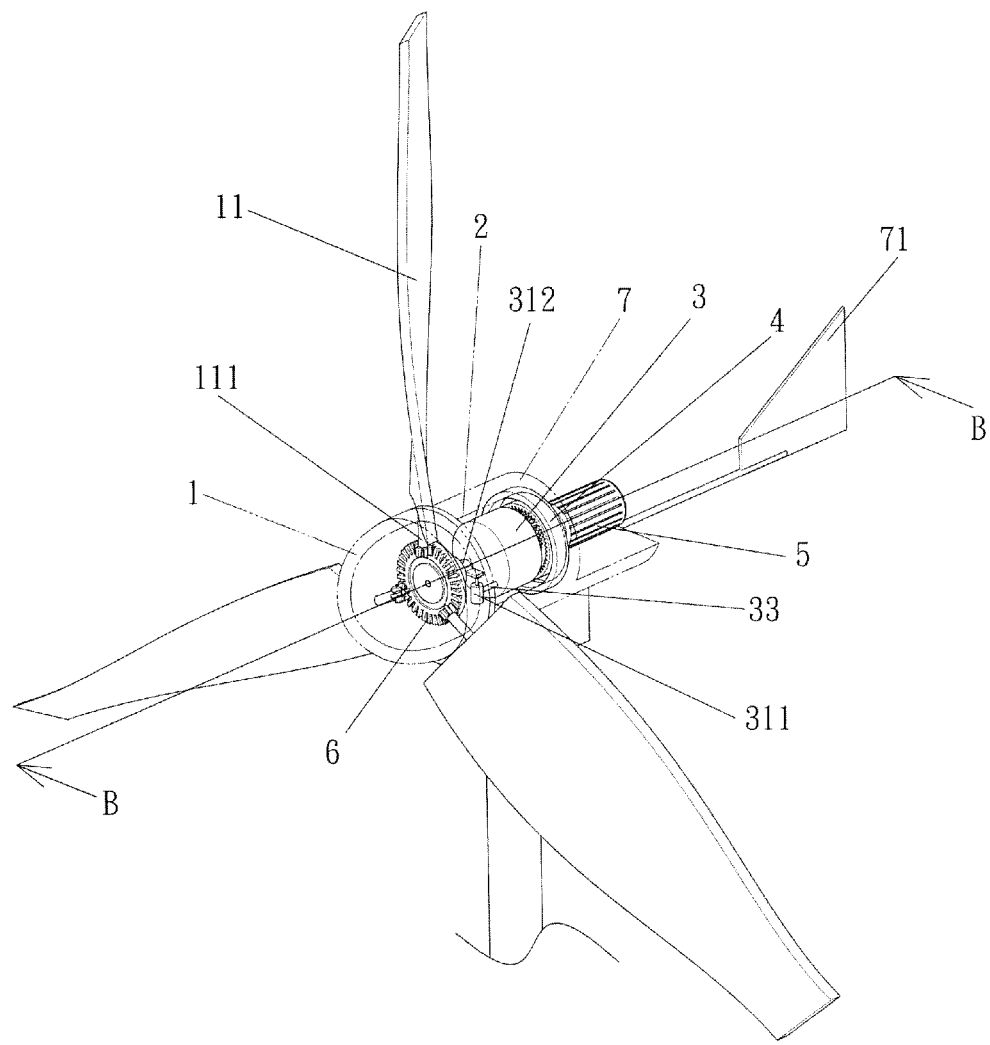
FIG. 7 shows the wind turbine of the present invention.
Figure 8:
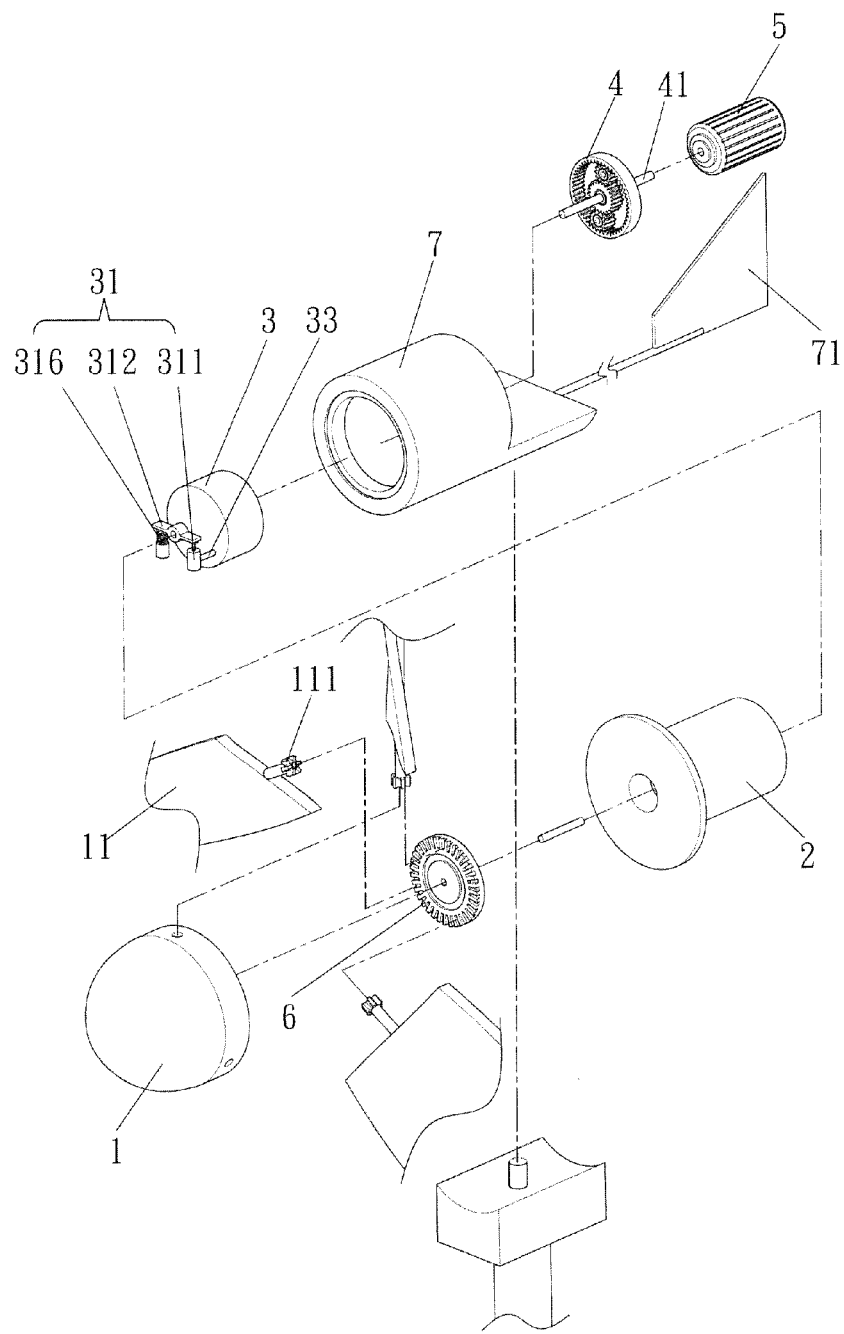
FIG. 8 is an exploded view to show the wind turbine of the present invention.
Figure 9:
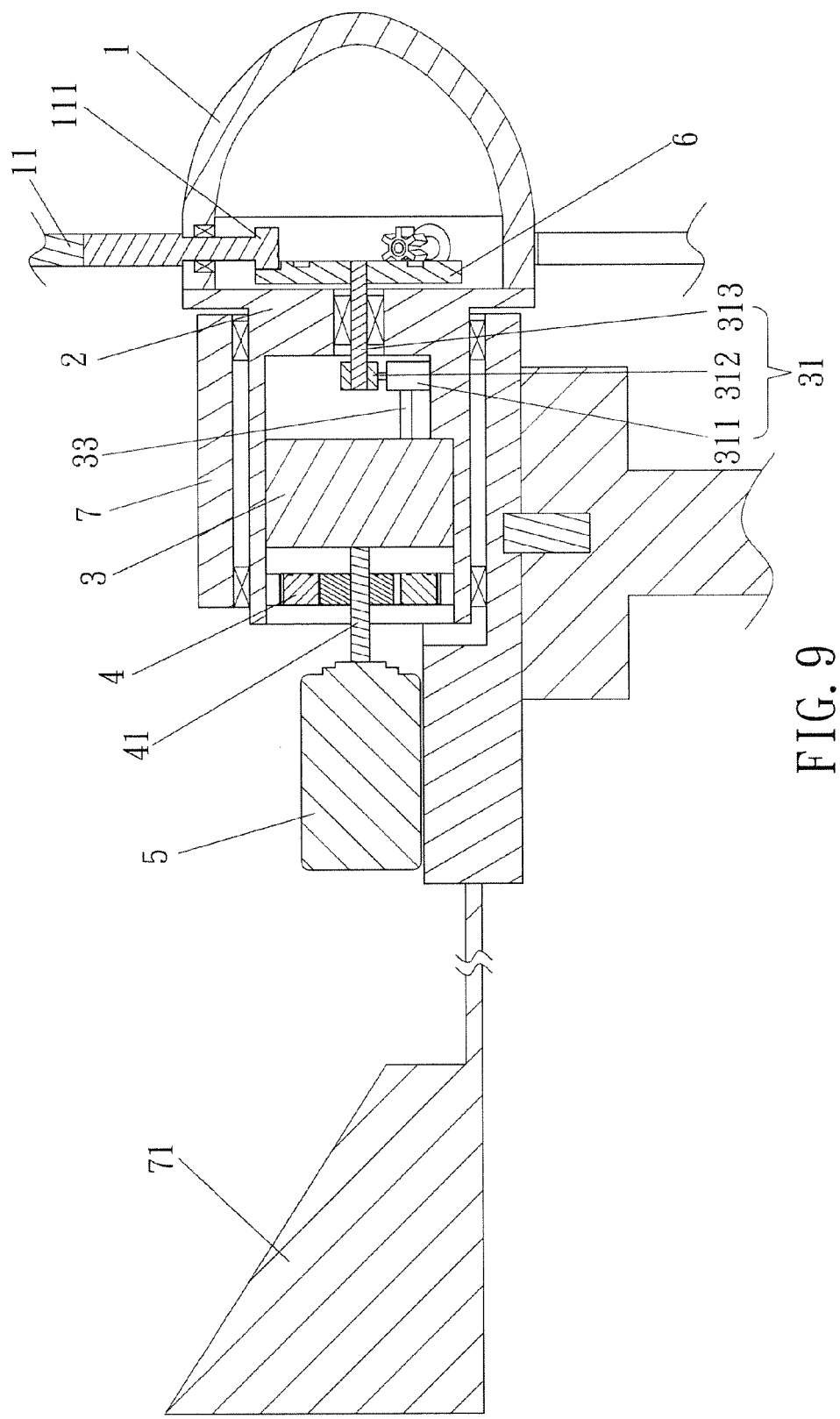
FIG. 9 is a cross sectional view taken along line B-B in FIG. 8.
Figure 10:
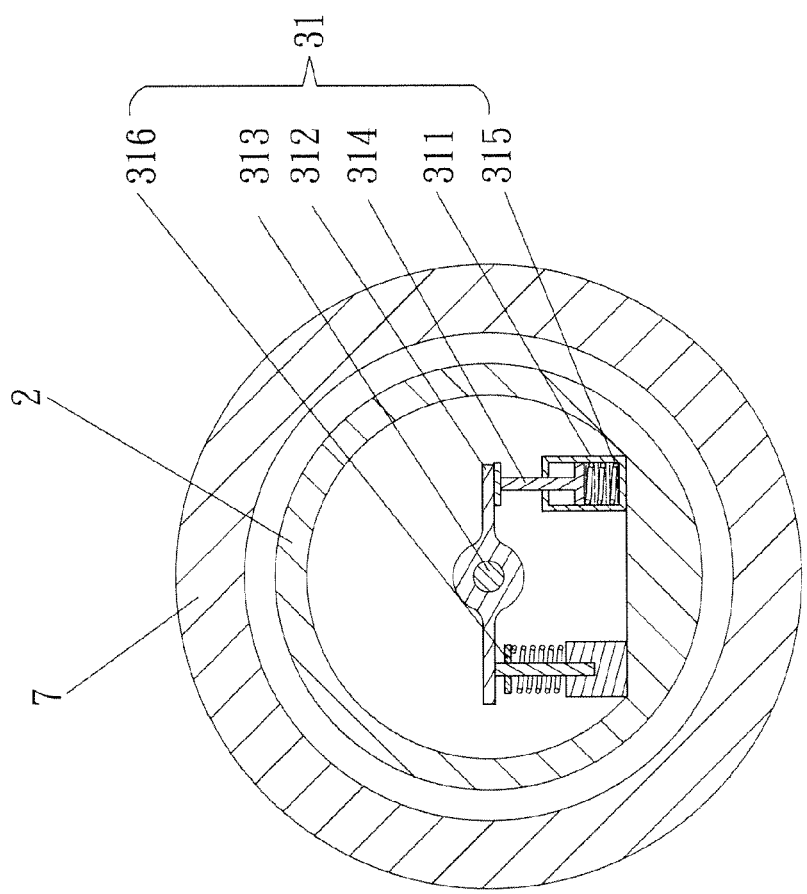
FIG. 10 is a cross sectional view showing that the speed of the driving unit is zero.

Referring to FIGS. 7 to 14, the automatic adjustment device for adjusting inclination of blades of wind turbines of the present invention comprises a first housing 1 and multiple blades 11 are connected to the first housing 1. Each blade 11 has a first connection portion 111 which is inserted into the first housing 1. The first connection portion 111 is a gear.

A transmission unit 2 is connected to the first housing 1. A pump unit 3 and a speed-changing member 4 are mechanically connected to the transmission unit 2. The speed-changing member 4 changes speed from the transmission unit 2, and the pump unit 3 is mechanically connected to the speed-changing member 4. The speed-changing member 4 is connected to one end of the pump unit 3 and the speed-changing member 4 is further connected to a generating device 5 at one end thereof away from the pump unit 3. The pump unit 3 has a driving unit 31 which is connected with a transmission disk 6 and the transmission disk 6 is connected to the connection portions 111 of the blades 11. The transmission disk 6 is a toothed disk so as to be engaged with the connection portion 111. When the revolution speed of the first housing 1 is zero, the inclination angle of the blade 11 is set to catch the wind force to generate torque so as to reduce the starting wind velocity. When the revolution speed of the first housing 1 is larger than a pre-set value, the inclination angle of the blade 11 is set not to catch the wind force and does not generate torque so as to protect the wind turbine form being damaged due to high revolution speed.

The pump unit 3 is a hydraulic pump and the driving unit 31 is rotated by the hydraulic liquid 32 provided by the pump unit 3. The driving unit 31 has a cylinder 311 which is connected to a movable member 312. The movable member 312 is connected to the transmission disk 6 via the transmission shaft 313. The cylinder 311 has a rod 314 which is connected to the movable member 312. A resilient member 315 is connected between the cylinder 311 and the rod 314. Another resilient member 316 is connected to one end of the movable member 312 and located away from the transmission shaft 313 and the cylinder 311.

A second housing 7 is mounted to the transmission unit 2 and has a tail wing 71 so that the wind turbine is able to swing to allow the blades 11 to face the wind direction.

Figure 11:
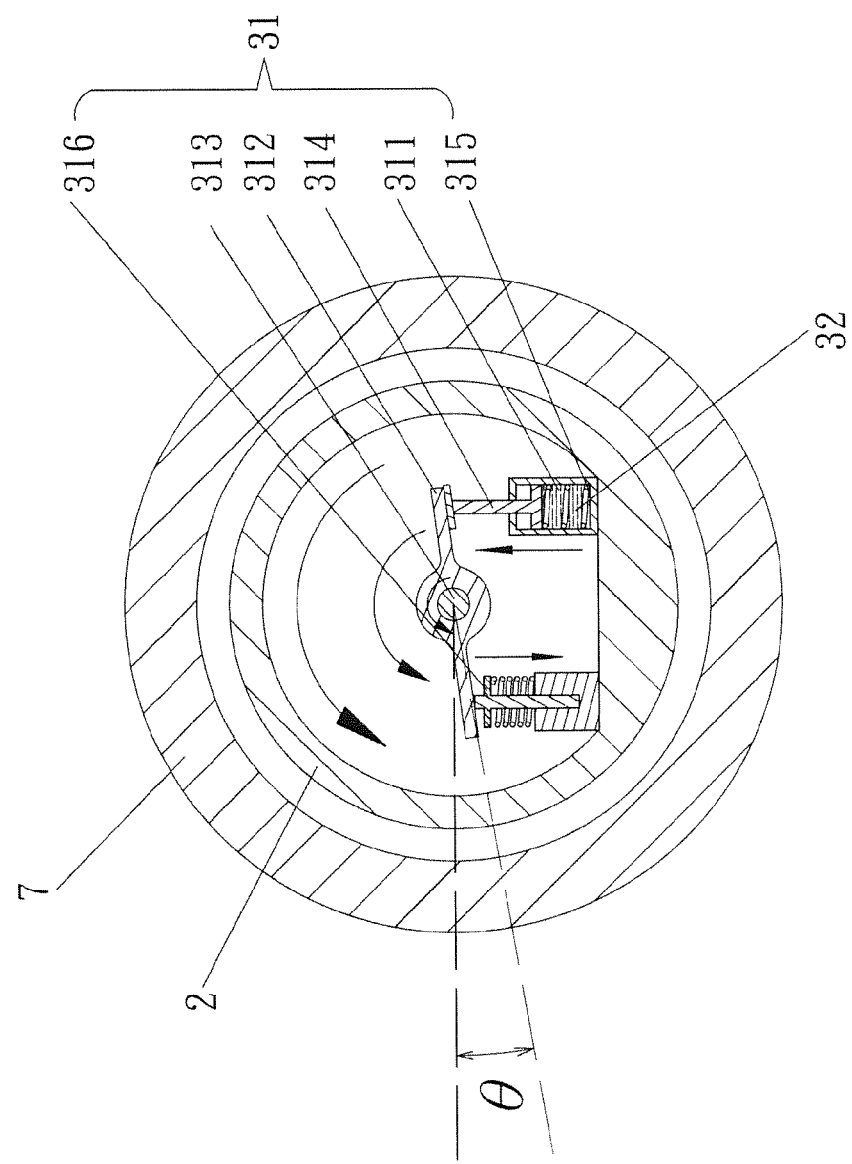
FIG. 11 is a cross sectional view showing that the speed of the driving unit is not zero.
Figure 12:
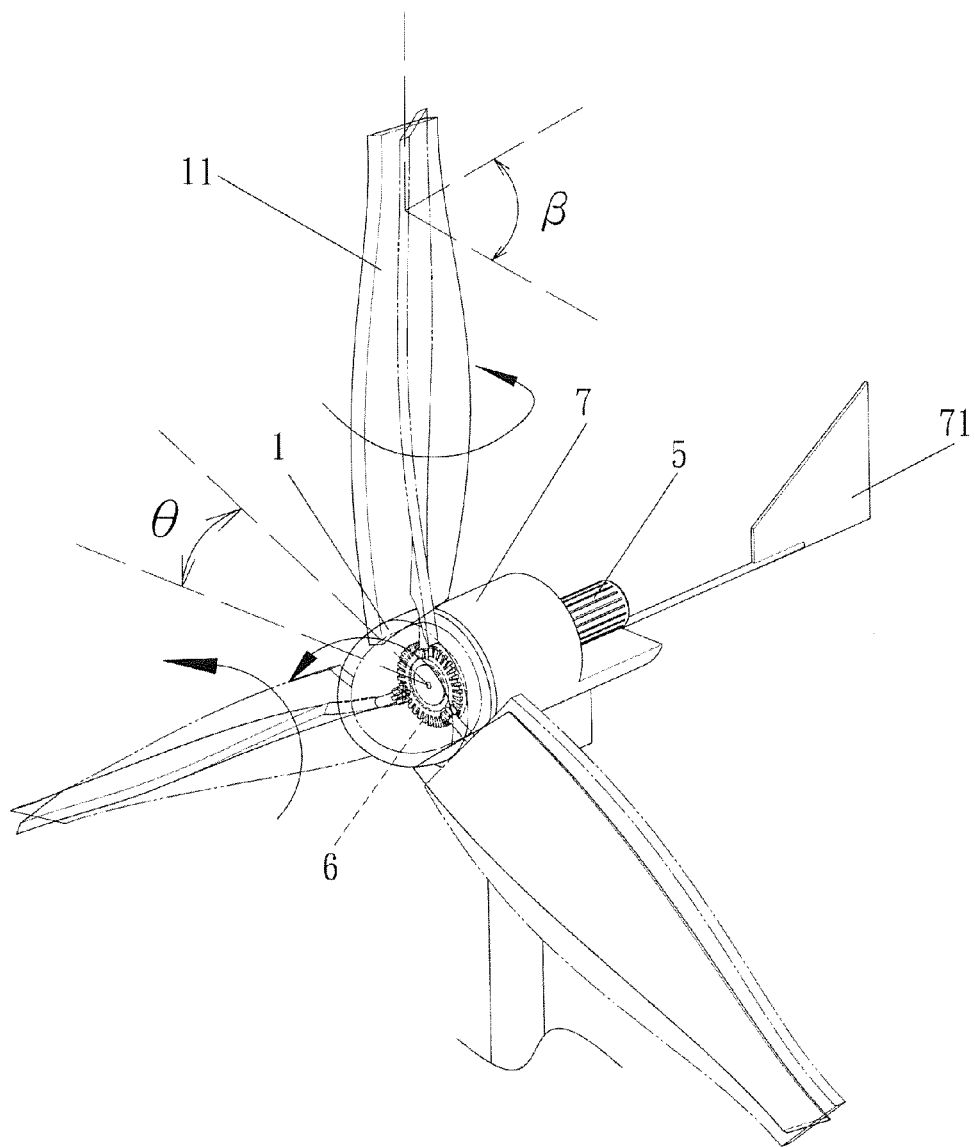
FIG. 12 is a perspective view to show the blades and the transmission disk when the wind turbine is in action.
Figure 13:
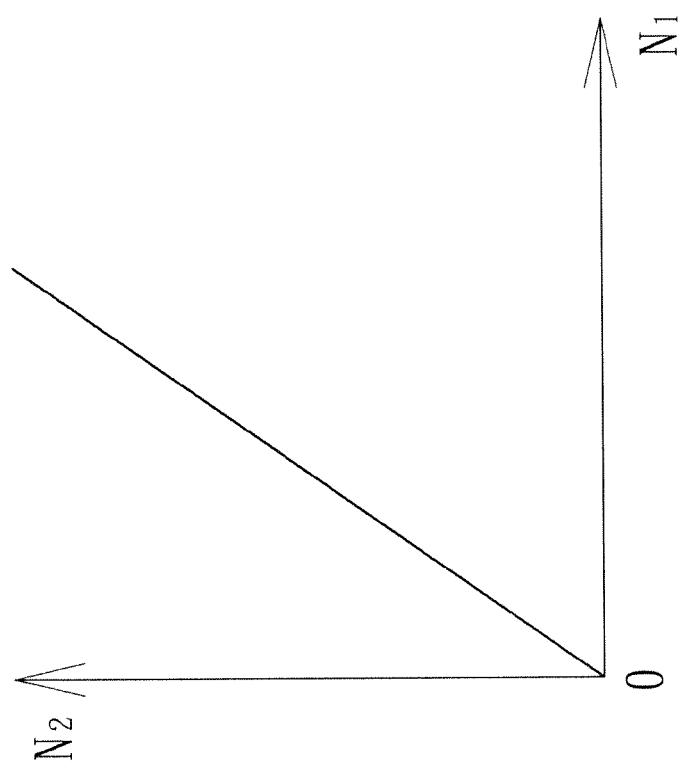
FIG. 13 shows the relationship between the speed $N_1$ of the first housing and the speed $N_2$ of the central shaft.

As shown in FIGS. 7 to 14, assume the revolution speed of the first housing 1 is $N_1$ and assume $N_1$ is zero, the inclination angle of the blade 11 is set to catch the wind force to generate torque so as to reduce the starting wind velocity. When the blades 11 are rotated by the wind and generate torque, the first housing 1 is driven by the rotation of the blades 11 and the first housing 1 then synchronically rotate the transmission unit 2 and the pump unit 3 at the speed of $N_1$. The speed-changing device 4 has a central shaft 41 and amplifies the revolution speed of the transmission unit 2 such that the speed of the central shaft 41 is $N_2$. As shown in FIG. 13, the relationship between $N_1$ and $N_2$ is $N_2=kN_1$, wherein k is a contact number larger than 1. The central shaft 41 is connected to the generating device 5 so as to increase the efficiency of generating. The other end of the central shaft 41 is further connected to the pump unit 3. There is a speed difference between the speed $N_1$ of the transmission unit 2 and the speed $N_2$ of the relative speed of the speed-changing device 4 to the pump unit 3. The speed difference is expressed by the equation: $N_2-N_1=k\,N_1-N_1=(k-1)\,N_1$.

Figure 14:
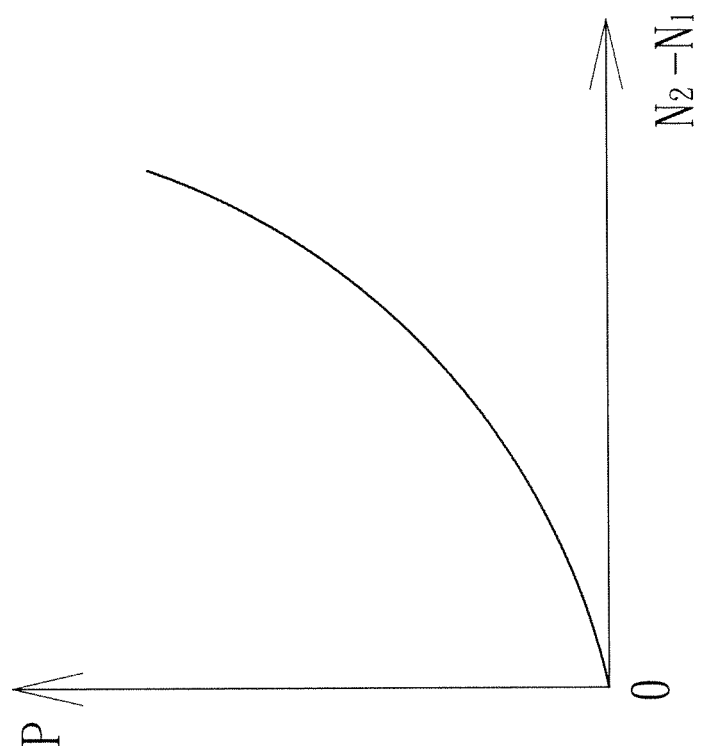
FIG. 14 shows the relationship between the speed difference of $N_1-N_2$ and the pressure P of the pump unit.

Assume the pressure of the hydraulic liquid provided by the pump unit 3 is "P" and the relationship between P and the speed difference N2−N1 is disclosed in FIG. 14, which means that the larger the speed difference is, the larger the pressure of the hydraulic liquid provided by the pump unit 3.

As shown in FIGS. 9 to 14, the pump unit 3 has a hose 33 via which the pump unit 3 is connected with the cylinder 311 and the hydraulic liquid 32 is delivered to the cylinder 31 via the hose 33. As shown in FIG. 11, by the assistance of the resilient member 315, the rod 314 is lifted to apply a torque to the movable member 312 which is rotated and compress the resilient member 316. Therefore, the transmission shaft 313 and the disk 6 are rotated. The rotation of the disk 6 adjusts the inclination angle of the blades 11 via the connection portions 111. As shown in FIG. 12, the disk 6 is rotated an angle of θ, the connection portions 111 and the blades 11 are adjusted to have the inclination angle of β. The first housing 1 is co-rotated with the blades 11, and the transmission unit 2, the pump unit 3 and the driving unit 31 are co-rotated with the blades 11. The speed difference $N_2-N_1$ drives the pump unit 3 and the pressure P of the hydraulic liquid drives the movable member 312, the transmission shaft 313 and the disk 6, so that the blades 11 are adjusted to have the inclination angle of β.

Figure 15:
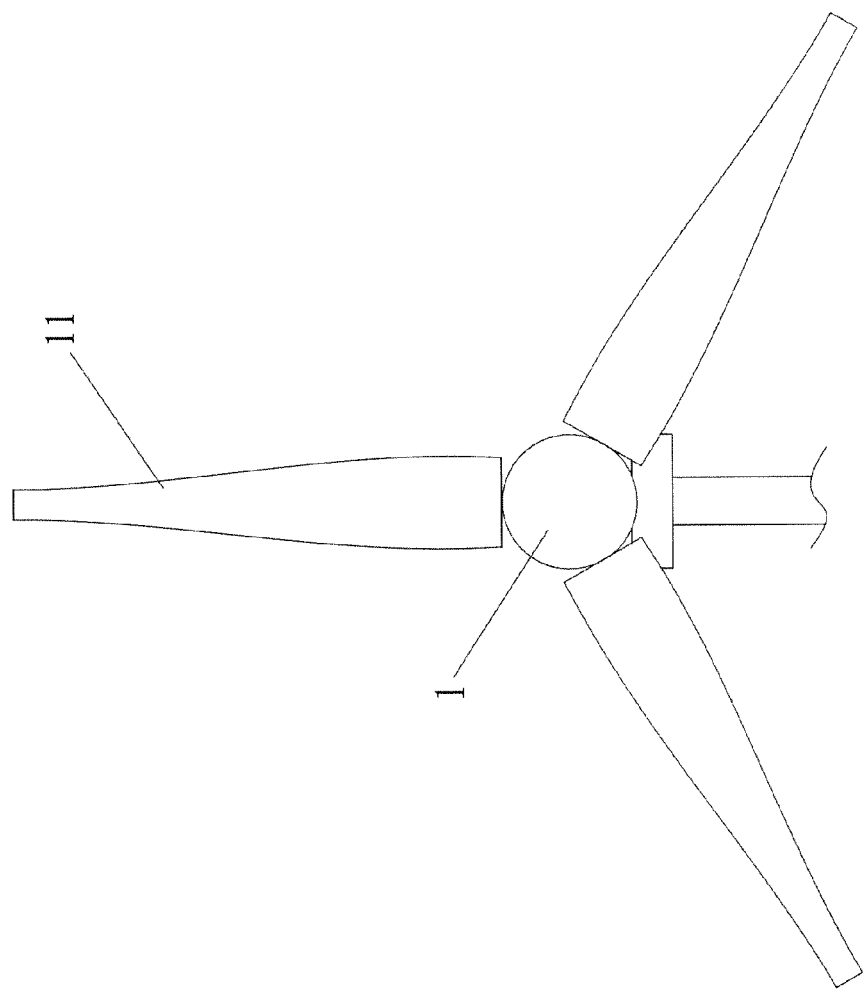
FIG. 15 shows that the blades generate torque when being applied by the wind velocity $V_{wind}$.

As shown in FIGS. 13 and 14, when the wind becomes weak and the speed difference $N_2-N_1$ reduces, the pressure P of the hydraulic liquid is reduced accordingly, so that the rod 314 is lowered and the resilient member 316 bounces back to rotate the movable member 312 reversely. The angle θ of the disk 6 is reduced so that the angle β is also reduced as shown in FIG. 15, the blades 11 are adjusted to catch the weak wind force.

Figure 16:
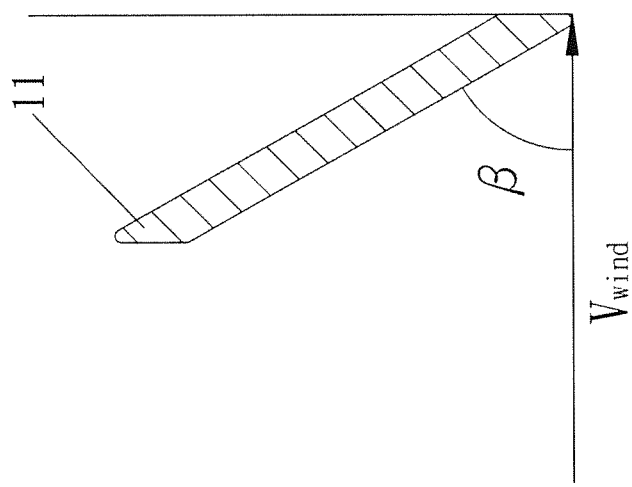
FIG. 16 shows the relationship between the wind velocity and the distal end of the blade when $N_1=0$.
Figure 17:
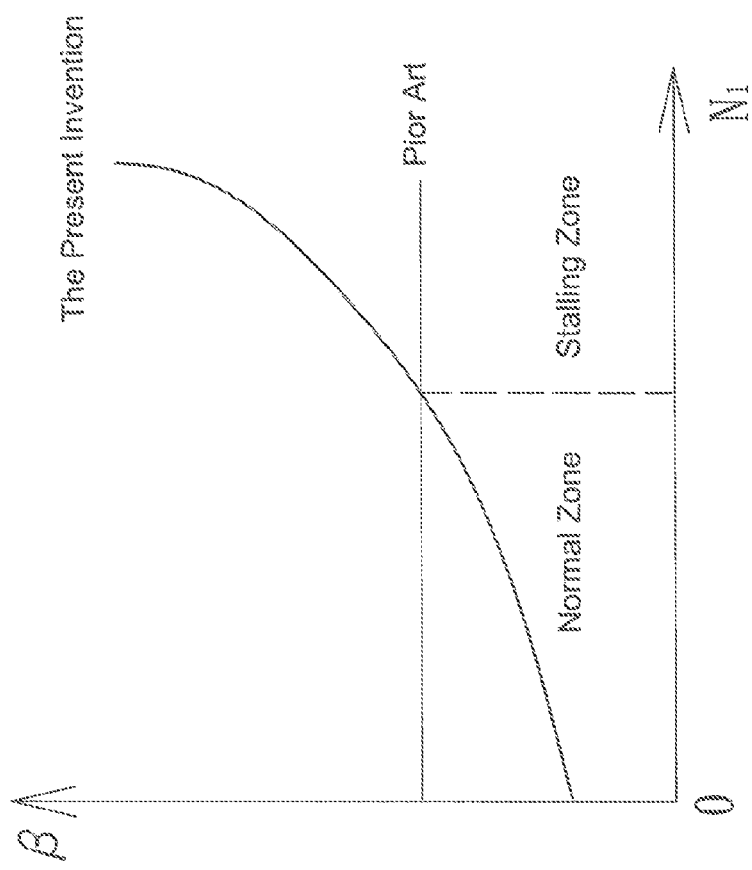
FIG. 17 shows the relationship between the speed $N_1$ and the two respective inclination angles of the blades of the conventional wind turbine and the wind turbine of the present invention.
Figure 18:
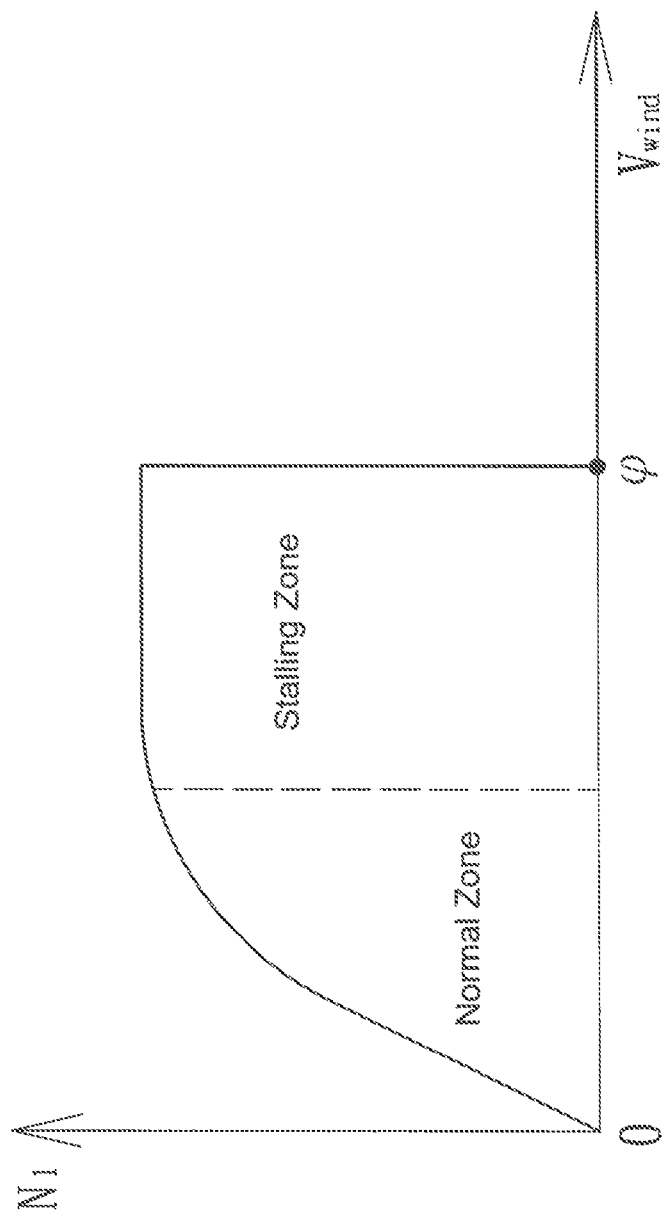
FIG. 18 shows the relationship between the speed $N_1$ and the wind velocity $V_{wind}$.
Figure 19:
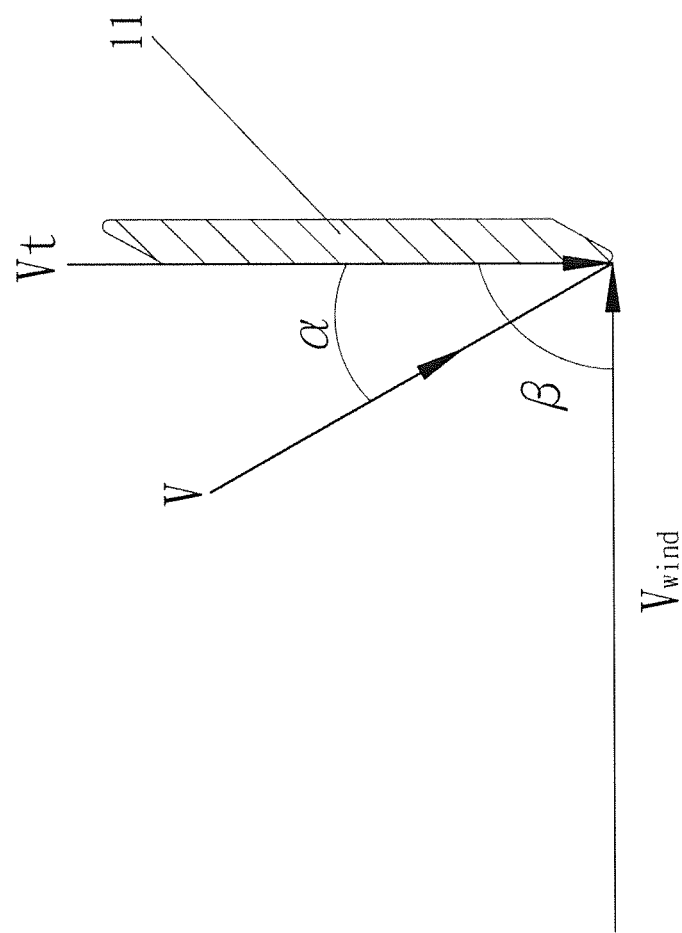
FIG. 19 shows the relationship between the wind velocity $V_{wind}$, the V and the $V_t$ in a normal zone.
Figure 20:
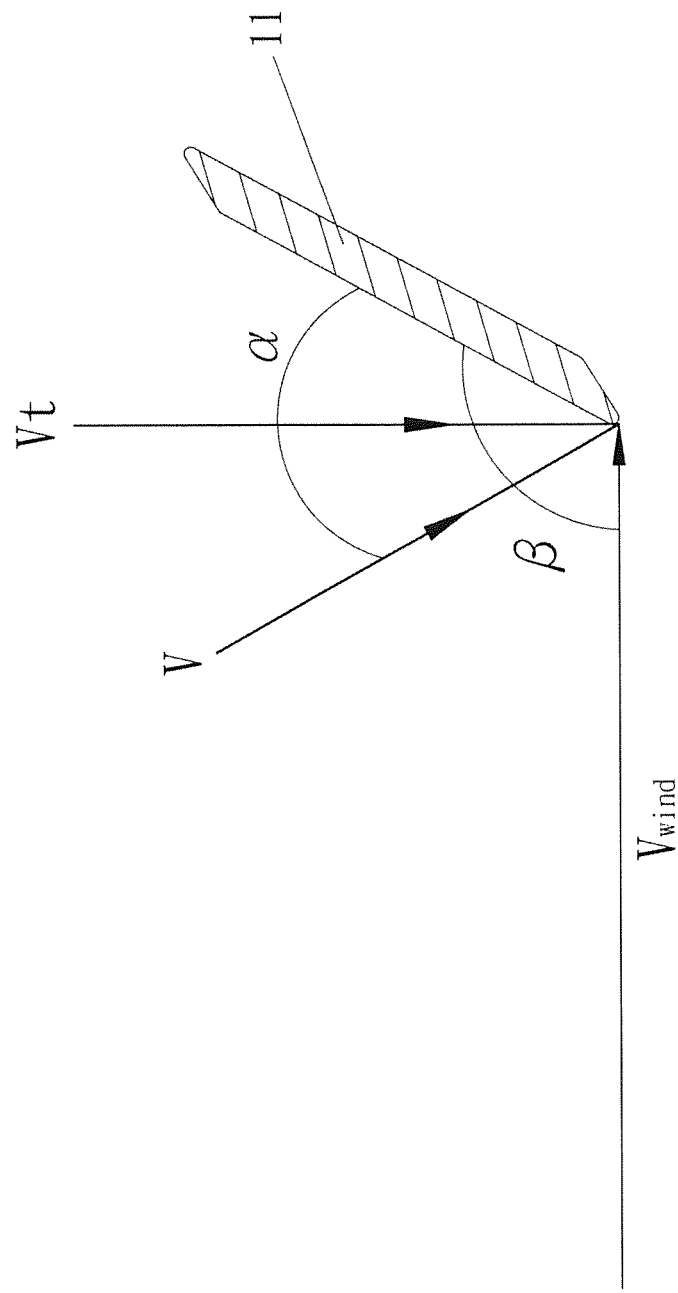
FIG. 20 shows the relationship between the wind velocity $V_{wind}$, the V and the $V_t$ in a stalling zone.
Figure 21:
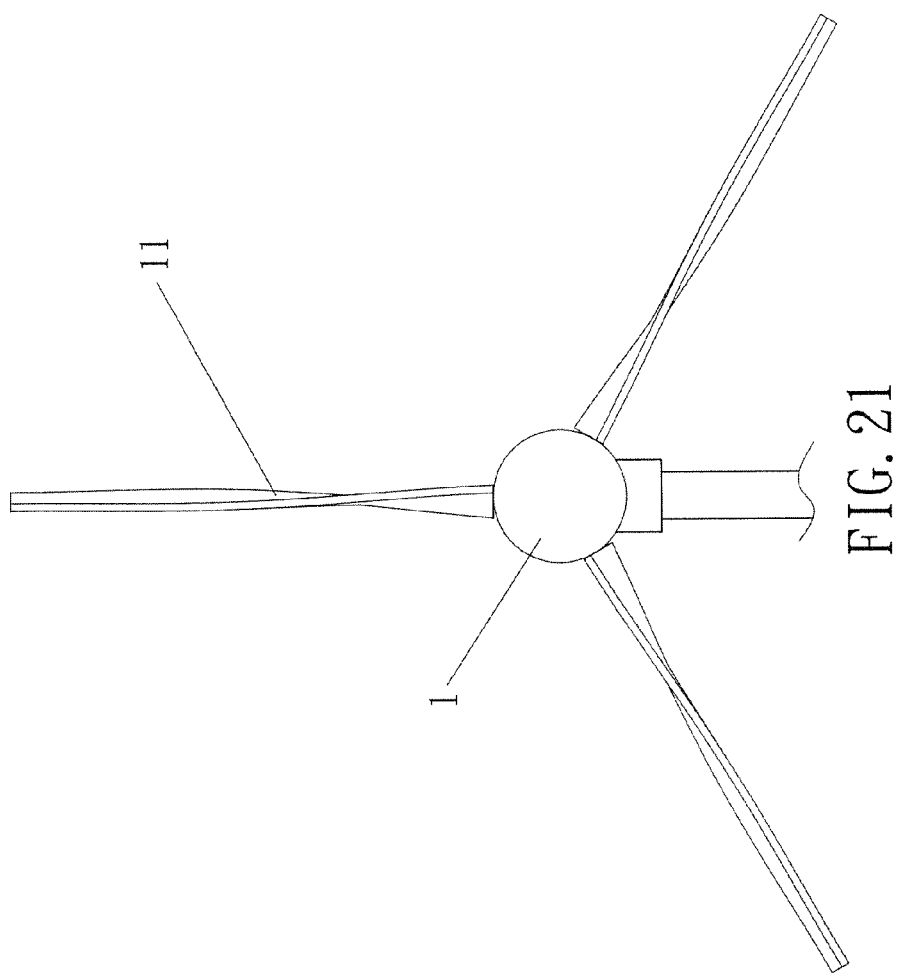
FIG. 21 shows the relationship between the wind velocity $V_{wind}$ and the inclination angle of the blade while the blade does not generate torque.

As shown in FIG. 16, the distal end of each of blades 11 is the area to catch the wind to generate torque. Assume the wind velocity is $V_{wind}$, when $N_1=0$, the inclination angle β at the distal end of the blade 11 is set to easily catch the wind as shown in FIG. 15 so that the blades 11 are rotated by weak wind so as to reduce the starting wind velocity. When the $V_{wind}$ increases and reaches the starting wind velocity, and the $N_1$ is located within the normal area as shown In FIGS. 17 and 18. The relationship between the speed $N_1$ and the two inclination angle β of the blades 11. FIG. 18 shows the relationship between the speed $N_1$ and the wind velocity $V_{wind}$. Referring to FIGS. 17 to 19, the relative velocity and attack angle of the wind velocity $V_{wind}$ to blade 11 are represented by V and α respectively. When the blades 11 and the first housing 1 rotate at the speed of $N_1$, the angle θ that the disk 6 rotates is increased and the inclination angle β of the blades is increased. Assume the length of the blade 11 is R, the relationship between the $V_{wind}$ and the $V_t$ is expressed by the equation $V_t=(2\pi N_1 R)/60$. When the $V_{wind}$ makes the speed $N_1$ be too high, the $N_1$ is located in the stalling area as shown in FIGS. 17, 18 and 20, the attack angle α and the inclination angle β increase along with the increase of the $V_{wind}$ so as to reduce the increment of the $N_1$, so that the $N_1$ can be maintained within a range of the $V_{wind}$. FIG. 17 shows the relationship between the speed $N_1$ and the two respective inclination angles β of the blades of the conventional wind turbine and the wind turbine of the present invention. It is clear that the $N_1$ of the present invention does not stall by the control of the inclination angle β of the blades 11. For the conventional stationary wind turbine, the inclination angle β of the blades cannot be adjusted, so that when the $V_{wind}$ increases, the $N_1$ increases as well, so that the wind turbine stalls. When the $V_{wind}$ is over a critical value φ, the inclination angle β of the blades 11 is set not to generate torque. In other words, as shown In FIGS. 18 and 21, the blades 11 are parallel to the direction of the wind so that the wind cannot drive the blades 11 and the first housing 1, the blades 11 are protected from being broken due to high speed rotation.

The speed difference $N_2-N_1$ drives the pump unit so as to provide hydraulic liquid with the pressure of P to adjust the inclination angle of the blades without using electric power. The present invention does not need to use electric speed-reducing device to force the blade to slow down. When the wind velocity increases and the rotation speed $N_1$ of the first housing is larger than a pre-set value, the inclined angle of the blades is set not to generate torque. Accordingly, the wind cannot drive the blades and the first housing, so that the blades are protected from being broken due to high speed rotation.

When the wind turbine is not driven by the wind which means the wind is too weak to drive the blades, the inclination angle β of the blades is set to catch the wind force so as to reduce the starting wind velocity and to increase the efficiency of the wind turbine.

When present invention is located within the stalling area, the attack angle α and the inclination angle β increase along with the increase of the $V_{wind}$ so as to reduce the increment of the $N_1$, the $N_1$ can be maintained within a range of the $V_{wind}$. FIG. 17 shows that the $N_1$ of the present invention does not stall by the control of the inclination angle β of the blades. As shown in FIG. 18, when the $V_{wind}$ is over a critical value φ, the inclination angle β of the blades is set not to generate torque. In other words, the blades are parallel to the direction of the wind so that the wind cannot drive the blades and the first housing, and the blades 11 are protected from being broken due to high speed rotation. For the conventional stationary wind turbine, the inclination angle of the blades cannot be adjusted, the $N_1$ increases along with the increase of the $V_{wind}$, so that the conventional wind turbine stalls. The electric speed-reducing device has to be used to slow down the blades to prevent the blades from being broken. Therefore, the present invention is more advance and efficient.

While we have shown and described the embodiment in accordance with the present invention, it should be clear to those skilled in the art that further embodiments may be made without departing from the scope of the present invention.

What is claimed is:
1. An automatic adjustment device for adjusting inclination of blades of wind turbines, comprising:

a first housing having multiple blades connected thereto and each blade having a first connection portion which is inserted into the first housing;

a transmission unit connected to the first housing, a pump unit and a speed-changing member mechanically connected to the transmission unit, the speed-changing member changing speed from the transmission unit, the pump unit mechanically connected to the speed-changing member, the pump unit having a driving unit which is connected with a transmission disk and the transmission disk connected to the connection portions of the blades;

the pump unit being activated by speed difference between the speed-changing member and the transmission unit so as to rotate the transmission disk via the driving unit and to adjust inclination angle of the blades.

2. The device as claimed in claim 1, wherein the connection portion is a gear and the transmission disk is a toothed disk so as to be engaged with the connection portion.

3. The device as claimed in claim 1, wherein when the speed of revolution of the first housing is zero, the blade has an inclination angle and is applied by wind to generate torque, when the speed of revolution of the first housing is larger than a pre-set value, the blade has another inclination angle and is applied by wind and does not generate torque.

4. The device as claimed in claim 1, wherein the speed-changing member is connected to a generating device at an end away from the pump unit.

5. The device as claimed in claim 1, wherein the pump unit is a hydraulic pump and delivers hydraulic liquid to drive driving unit.

6. The device as claimed in claim 5, wherein the driving unit has a cylinder which is connected to a movable member, the movable member is connected to the transmission disk via a transmission shaft.

7. The device as claimed in claim 6, wherein the cylinder has a rod which is connected to the movable member, a resilient member is connected between the cylinder and the rod.

8. The device as claimed in claim 6, wherein a resilient member is connected to one end of the movable member and located away from the transmission shaft and the cylinder.

9. The device as claimed in claim 1, wherein a second housing is mounted to the transmission unit.

10. The device as claimed in claim 1, wherein the second housing has a tail wing.

\* \* \* \* \*